March 30, 1937.  J. VAN HULST  2,075,244
PROCESS FOR SOLIDIFYING EARTH
Filed June 7, 1935
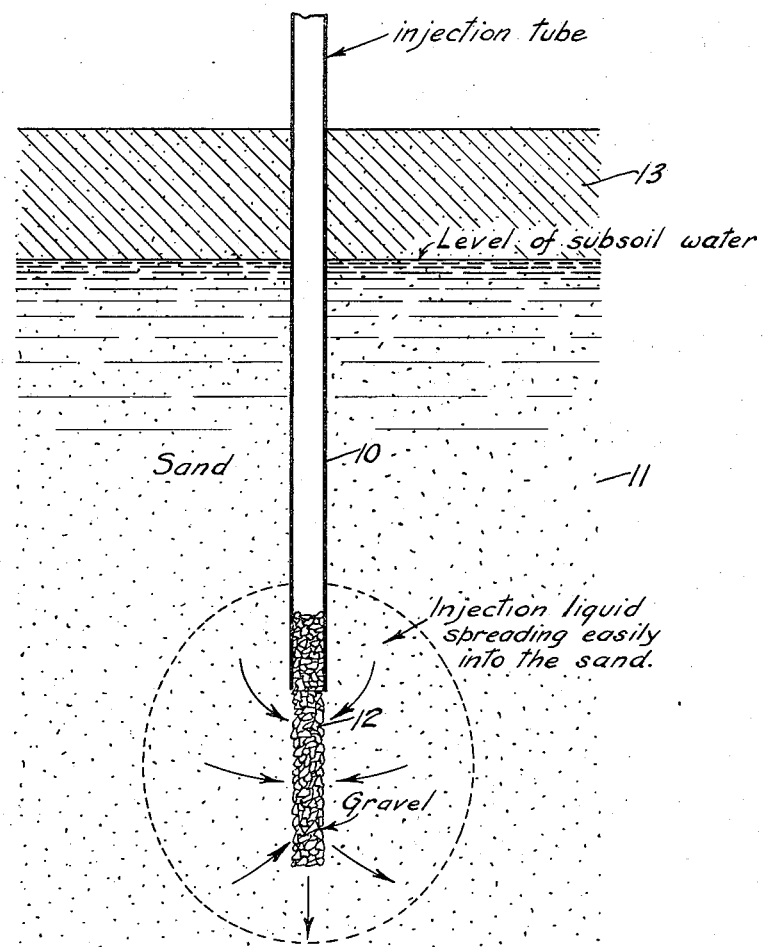
INVENTOR
JAN VAN HULST.
BY
Samuel Stearman
ATTORNEY Patented Mar. 30, 1937

2,075,244

UNITED STATES PATENT OFFICE 2,075,244

PROCESS FOR SOLIDIFYING EARTH

Jan van Hulst, Amsterdam, Netherlands, assignor to The Patents and Licensing Corporation, Boston, Mass., a corporation of Massachusetts Application June 7, 1935, Serial No. 25,379
In the Netherlands June 14, 1934

16 Claims. (Cl. 61—36)

This invention relates to the treatment of porous or pervious soils or coil layers, such as sand soils or other mobile or loose ground formations, and is more specifically concerned with a method whereby such soils are rendered impervious or substantially impervious to water or gases.

This invention has many practical applications, such, for example, as in building canals, sluices or dykes in porous soil, where it is desirable to stop the percolation of water through the sand, or in constructing bridge pillars, landing piers, tunnels, etc., in ground formations which are not sufficiently firm or impervious. Likewise, in oil well drilling practice, it often happens that a well passes through such excessively porous strata that the drilling mud cannot form an impervious mud sheath on the walls of the borehole, but penetrates into the porous formation with the result that a loss of circulation is experienced. The present invention is of great value in eliminating this difficulty, as also, in other cases, in shutting off formation waters tending to enter the borehole.

The single figure of the drawing illustrates one method of practicing the invention.

In my application Serial No. 668,033, filed April 26, 1933, I have already disclosed a process which consists in introducing an aqueous dispersion of a bituminous substance, such as asphalt, into the porous soil or mass to be treated, and causing this dispersion to coagulate at the desired place and/or depth by suitably controlling the stability of the dispersion. This may be effected either by adding to the dispersion coagulation-promoting agents such as electrolytes or other agents disclosed in my above-mentioned application, or applying such agents to the soil before, during or after the introduction of the dispersion, in order to produce a proper coagulation of the latter at the required place. On the other hand, if electrolytes which may affect the rate of the coagulation are already present in the soil, it may be necessary or advantageous to reduce their concentration in the soil, by a preliminary application of pure water or of a solution of coagulation-hindering agents, such as alkaline solutions.

I have also found that especially good results may be obtained by carrying out this process with a mixture of an aqueous bitumen dispersion with a finely divided colloidal substance which can be either of organic or inorganic origin. For example, it is possible to use clays such as bentonite, refractory blue clay, potter's clay, fuller's earth, waterglass, silicic acid gel, diatomaceous earth, Cassel earth and other substances containing humic acids, gelatine, glue, etc.

Although the substances mentioned above, and especially clay, possess emulsifyng properties of their own, the bitumen dispersions formed with their aid are of a relatively coarse character, and may not be very well suited for the purposes of this invention, since they do not penetrate readily into porous soils. It is therefore preferable to add clay, a clay suspension, or any other substance with colloidal properties to a relatively finely divided bitumen dispersion formed with the aid of known emulsifiers, such, for example, as those of the soap type. The clay in this case does not act as an emulsifier, nor does it exert a flocculating or coagulating action on the bitumen dispersion, but is present therein in intimate contact with the bitumen particles. Because of the presence of the colloidal substance in the interface between the bitumen and the water of the dispersion, larger complexes consisting of the bitumen and of the material added are formed and tend to fill the voids in the porous ground being treated even more thoroughly than would be possible with coagulated bitumen alone. In this way, bitumen dispersions of considerably lower concentration may be used, and the amount of bitumen required to render a given soil formation impervious to water or gases is substantially decreased. For example, in a case where a certain amount of a dispersion diluted with water to a 30% bitumen content was considered necessary, equally favorable results were obtained by applying the same amount of the dispersion diluted with water to only a 8% bitumen content and containing in addition 2% of a good colloidal clay.

However, in treating porous soils either with a bitumen dispersion, or with a bitumen dispersion containing a colloidal substance, difficulties are sometimes experienced in introducing the impregnating agents into the porous soil in such a manner as to obtain at the desired place a water-impervious layer of suitable size and shape.

I have now found that this difficulty may be eliminated, and the treating agent may be readily and uniformly introduced into the ground by first placing in or near the porous layer a quantity of coarse material, such as gravel, gravel stones, stone chippings, or any other rock aggregate, and causing the bituminous dispersion to penetrate the porous soil through this coarse material.

In the simplest case, such as when it is desired to treat a layer close to the surface of the soil, a quantity of rock aggregate can be spread at the place where the impregnating agent has to be introduced into the soil. This process is, however, entirely different from the well known process of applying a bituminous emulsion to a layer of rock aggregate spread, for example, on the surface of a road. In the latter case, a relatively unstable emulsion is used, which breaks on contact with the rock aggregate, without appreciably penetrating into the soil. According to this invention, bitumen emulsions of considerable stability are used, so that no break occurs on contact with the rocky mass. The emulsion passes through the rocky mass and breaks only after penetrating the porous layer to a considerable distance. This distance may be regulated by suitably controlling the stability of the emulsion, or by treating the soil with the coagulation-promoting or coagulation-hindering agents mentioned above.

In treating a porous layer located at a certain depth, a shaft or bore-hole may be drilled to and through said layer and filled with a mass of rock aggregate, a bituminous emulsion being subsequently applied to the porous layer through the rocky mass, if desired, under pressure. Owing to the large volume of space occupied by the rock aggregate, a relatively small quantity of a bitumen emulsion is sufficient to fill the borehole. The emulsion is thus in contact with the walls of the borehole and penetrates the porous layer not only at or near the bottom of the borehole, but throughout its entire depth, which makes possible a uniform impregnation of a layer of any desired thickness. As stated above, the stability of the emulsion prevents its coagulation before it has penetrated the porous layer to a considerable distance. The porous layer may, if desired, be subjected to a preliminary treatment with coagulation promoting or coagulation-hindering agents.

A preferred method of applying this invention in practice is illustrated in the figure of the drawing and consists in placing a casing or a pipe 10 of suitable diameter in a borehole drilled to and through the porous layer 11, and filling said casing with a coarse material 12 of desired particle size. The casing may or may not reach the bottom of the borehole, or may, after being filled with rock aggregate, be partially pulled out, preferably not beyond the upper level of the layer to be treated. The impregnating agent is then fed through the pipe 10 and thence through the coarse material 12 into the soil layer 11 as described above, the casing serving as a shield against the penetration of the emulsion into the strata 13 overlaying the porous layer and which it is not desired to impregnate. To insure that no foreign material besides the selected rock aggregate will be present in the casing or pipe, the latter may sometimes be provided with a loose preferably tapering stopper at its lower end. At a desired moment, for example, when raising the pipe, pressure may be applied to the rocky material 12 filling the pipe, thereby ejecting the stopper and the rocky material into the borehole. In other cases, it may be likewise possible to force into the soil a pipe open at the bottom end, subsequently removing the earth therefrom, and filling it with the coarse material 12, after which the treatment proceeds as described above.

Only relatively finely-divided and stable impregnating agents, such as bitumen dispersions or bitumen dispersions containing a colloidal substance, may be successfully used for the purposes of this invention. Other binding agents which are commonly used in combination with rocky materials, such for example, as thin cement mortars, have been generally found unsuitable, since they distribute themselves in the spaces between the rock aggregate, but are unable, due to their coarse character, to penetrate the porous formation.

This invention may further be illustrated by the following example:

A bitumen from petroleum distillation with an A. S. T. M. penetration of 200 at 25° C. is heated to 120° C., and is then dispersed in water heated to about 40° C., to which 0.5% sodium hydroxide and 1.5% wood tar had been added. The bitumen content of the dispersion should be approximately 50%. A very fine dispersion may be obtained by using a suitable device, such as a colloidal mill, whereupon a stabilizer, such for example as 0.5% of casein, calculated on the weight of the bitumen, may be added.

The bitumen dispersion is then mixed with half its amount of a suspension of colloidal clay, such as bentonite, comprising approximately 1 part of bentonite to 9 parts of water by weight. Before being applied for the purposes of this invention, this mixture is further diluted with about twice its amount of water, 2% of methyl formiate being added at the same time, if desired.

If it is desired to treat a layer extending over a considerable distance, a number of shafts or boreholes may be drilled in the ground, filled with rock aggregate and cased by means of suitable pipes, whereupon the above dispersion may be applied to the porous layer underlying the upper soil layer in the manner described, if desired, under pressure. Depending on the porosity of the soil, the boreholes are suitably spaced, for example, they may be located at a distance of 10 feet from each other, and the amount of the liquid dispersion used is calculated so as to give an uninterrupted impregnated layer after all the dispersion has penetrated into the soil and coagulated therein.

I claim as my invention:

1. In the process of making a porous soil layer impervious to fluids, the steps of placing a mass of relatively coarsely divided material in contact with said layer, and causing an aqueous dispersion of bitumen to penetrate said porous layer through said coarse material without coagulating while in contact with the latter.

2. In the process of claim 1, using a mixture comprising an aqueous dispersion of bitumen and a finely divided colloidal substance.

3. In the process of claim 1, using a mixture comprising an aqueous dispersion of bitumen and a colloidal suspension of clay.

4. In the process of making a porous soil layer impervious to fluids, the steps of impregnating said layer with a coagulation-promoting agent, placing a mass of relatively coarsely divided material in contact with said layer, and causing an aqueous dispersion of bitumen to penetrate said layer through said coarse material without coagulating while in contact with the latter.

5. In the process of making a porous soil layer containing electrolytes impervious to fluids, the steps of impregnating said layer with water, thereby washing out at least a part of the electrolytes, placing a mass of relatively coarsely divided material in contact with said layer, and causing an aqueous dispersion of bitumen to penetrate said layer through said coarse material without coagulating while in contact with the latter.

6. In the process of making a porous soil layer containing electrolytes impervious to fluids, the steps of impregnating said layer with a coagulation-hindering agent, placing a mass of relatively coarsely divided material in contact with said layer, and causing an aqueous dispersion of bitumen to penetrate said layer through said coarse material without coagulating while in contact with the latter.

7. In the process of making a porous layer impervious to fluids, the steps of placing a mass of relatively coarsely divided material in contact with a porous soil and impregnating said porous layer through said rocky mass first with an aqueous dispersion of bitumen and then with a coagulation-promoting agent.

8. In the process of making a porous subsoil layer impervious to fluids, the steps of forming a borehole in said layer, filling it with a relatively coarsely divided material, and causing an aqueous dispersion of bitumen to penetrate said layer through said coarse material without coagulating while in contact with the latter.

9. In the process of claim 8, using a mixture comprising an aqueous dispersion of bitumen and a finely divided colloidal substance.

10. In the process of claim 8, using a mixture comprising an aqueous dispersion of bitumen and a colloidal suspension of clay.

11. In the process of making a porous subsoil layer impervious to fluids, the steps of forming a borehole in said layer, providing at least a portion of the borehole with a casing, filling the borehole with a relatively coarsely divided material through said casing, and causing an aqueous dispersion of bitumen to penetrate the porous layer through said coarse material without coagulating while in contact with the latter.

12. In the process of claim 11, providing a casing for that portion of the borehole which extends from the upper level of the porous subsoil layer to the surface.

13. In the process of making a porous subsoil layer impervious to fluids, the steps of forming a borehole in said layer, placing a casing in the borehole, filling the casing with a relatively coarsely divided material, partially raising the casing while ejecting the coarse material into the borehole, and causing an aqueous dispersion of bitumen to penetrate the porous layer through said coarse material without coagulating while in contact with the latter.

14. In the process of claim 13, raising the lower end of the casing to approximately the elevation of the upper level of the porous layer.

15. In the process of making a porous subsoil layer impervious to fluids, the steps of forcing a pipe into the porous layer, removing the earth from said pipe, filling it with a relatively coarsely divided material, partially raising the pipe while ejecting the rocky material in the hole formed, and causing an aqueous dispersion of bitumen to penetrate said porous layer through said coarse material without coagulating while in contact with the latter.

16. In the process of claim 15, raising the lower end of the pipe to approximately the elevation of the upper level of the porous layer.

JAN van HULST.